US008620902B2

(12) United States Patent
Drumheller

(10) Patent No.: US 8,620,902 B2
(45) Date of Patent: Dec. 31, 2013

(54) COMPUTER PROGRAM PRODUCTS AND METHODS FOR QUERY COLLECTION OPTIMIZATION

(75) Inventor: Robert Drumheller, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 83 days.

(21) Appl. No.: 13/440,379

(22) Filed: Apr. 5, 2012

(65) Prior Publication Data

US 2012/0310920 A1 Dec. 6, 2012

Related U.S. Application Data

(60) Provisional application No. 61/492,160, filed on Jun. 1, 2011.

(51) Int. Cl.
*G06F 17/30* (2006.01)

(52) U.S. Cl.
USPC .......................................................... 707/716

(58) Field of Classification Search
USPC .......................................... 707/713, 716, 765
See application file for complete search history.

(56) References Cited

U.S. PATENT DOCUMENTS

| | | | |
|---|---|---|---|
| 6,185,558 B1 * | 2/2001 | Bowman et al. | 705/37 |
| 6,408,294 B1 * | 6/2002 | Getchius et al. | 1/1 |
| 7,031,958 B2 | 4/2006 | Santosuosso | |
| 7,636,732 B1 * | 12/2009 | Nielsen | 1/1 |
| 7,765,204 B2 * | 7/2010 | Gollapudi et al. | 707/721 |
| 7,788,255 B2 | 8/2010 | Sethi et al. | |
| 7,970,757 B2 | 6/2011 | Antani et al. | |
| 7,984,039 B2 * | 7/2011 | Carmel et al. | 707/713 |
| 2004/0002849 A1 | 1/2004 | Zhou | |
| 2004/0103090 A1 | 5/2004 | Dogl et al. | |
| 2007/0266002 A1 * | 11/2007 | Chowdhury et al. | 707/2 |
| 2008/0147638 A1 * | 6/2008 | Hoeber et al. | 707/5 |
| 2008/0215574 A1 | 9/2008 | Lin et al. | |
| 2010/0082602 A1 | 4/2010 | Ganapathi et al. | |
| 2010/0121840 A1 * | 5/2010 | Murdock et al. | 707/722 |
| 2011/0010359 A1 | 1/2011 | Burger | |
| 2011/0131157 A1 * | 6/2011 | Iyer et al. | 706/12 |
| 2012/0030198 A1 * | 2/2012 | Beck et al. | 707/723 |
| 2012/0179705 A1 * | 7/2012 | Kumaran et al. | 707/767 |

OTHER PUBLICATIONS

International Application No. PCT/US12/39065 filed May 23, 2012, International Search Report and Written Opinion, mailed Sep. 27, 2012.

* cited by examiner

*Primary Examiner* — Cam-Linh Nguyen
(74) *Attorney, Agent, or Firm* — Dinsmore & Shohl LLP

(57) ABSTRACT

Computer program products and methods for query collection optimization and executing a query collection against one or more electronic documents are disclosed. According to one embodiment, a method of executing a query collection having a plurality of full term queries against an electronic document includes receiving the query collection, determining common terms, and searching the electronic document for the common terms in accordance with a frequency that the common terms appear in the query collection. The method further includes, for each common term found in the electronic document, searching the electronic document for full term queries that include the common term that was found in the electronic document. The method further includes, for each common term not found in the electronic document, preventing a search of the electronic document for the full term queries that include the common term that was not found in the electronic document.

20 Claims, 4 Drawing Sheets

COMPUTER PROGRAM PRODUCTS AND METHODS FOR QUERY COLLECTION OPTIMIZATION

CROSS REFERENCE TO RELATED APPLICATIONS

The present application claims the benefit of U.S. Provisional Patent Application No. 61/492,160 filed on Jun. 1, 2011, which is hereby incorporated by reference in its entirety.

BACKGROUND

1. Field

The present specification generally relates to query collection searching of an electronic document and, more particularly, to computer program products and methods for query collection optimization.

2. Technical Background

In most cases, a single query is run against a collection of documents. For example, a query may be executed by an internet search engine against a plethora of web pages and documents, or a query may be executed against a legal document database to find legal opinions that have content that matches the query. However, in some cases many individual queries may be executed against a single document. The many individual queries may define a query collection. The query collection may be used to find particular text within the document, or to determine the underlying subject matter of the text of the document, for example. As a query collection may contain a large number of individual queries, it may take a significant amount of computer processing resources and time to fully execute each individual query of the query collection in sequence. Further, executing the individual queries in sequence may lead to inefficient searching as duplicative searches may be carried out.

Accordingly, a need exists for alternative computer program products and methods for query collection optimization to reduce the processing resources and time that may be needed to execute the query collection against one or more electronic documents.

SUMMARY

In one embodiment, a computer program product includes a computer-readable medium that stores computer-executable instructions. The computer program product is for use with a computer device to execute a query collection against one or more electronic documents, wherein the query collection includes a plurality of full term queries. The computer-executable instructions, when executed by a processor of the computer device, cause the computer device to receive the query collection, determine common terms within the query collection, and sort the common terms by a frequency within the query collection. The computer-executable instructions further cause the computer device to search the one or more electronic documents according to an optimized query collection plan such that the one or more electronic documents are searched for the common terms in accordance with the frequency within the query collection. For each common term found in the one or more electronic documents, the computer-executable instructions cause the computer device to search the one or more electronic documents for full term queries that include the common term that was found in the one or more electronic documents. For each common term not found in the one or more electronic documents, the computer-executable instructions cause the computer device to prevent a search of the one or more electronic documents for the full term queries that include the common term that was not found in the one or more electronic documents.

In another embodiment, a method of executing a query collection having a plurality of full term queries against one or more electronic documents includes receiving the query collection, determining common terms within the query collection, and searching, by a computer, the one or more electronic documents for the common terms in accordance with a frequency that the common terms appear in the query collection. The method further includes, for each common term found in the one or more electronic documents, searching the one or more electronic documents for full term queries that include the common term that was found in the one or more electronic documents. The method further includes, for each common term not found in the one or more electronic documents, preventing a search of the one or more electronic documents for the full term queries that include the common term that was not found in the one or more electronic documents.

In yet another embodiment, a method of creating an optimized query collection plan from a query collection having a plurality of full term queries includes receiving the query collection, determining common terms within the query collection, sorting the common terms by frequency within the query collection, and selecting a most frequent common term of the query collection. The most frequent common term is a common term that was not previously selected and occurs most frequently within the query collection. The method further includes creating a query path associated with the most frequent common term by adding the most frequent common term as a root node of the query path, searching for a nested common term within full term queries that contain the most frequent common term, wherein the nested common term is a term that occurs more than once within the full term queries that contain the most frequent common term, and adding the full term queries to the query path that include the most frequent common term and do not include any nested common term. The query path is further created by, if a nested common term was found, adding to the query path the nested common term, followed by adding the full term queries that include the most frequent common term and the nested common term, and preventing the full term queries that were added to the query path from being added to other query paths.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to computer program products and methods for optimizing a query collection comprising a plurality of full term queries (e.g., phrases, names, single words, etc.) for execution against one or more electronic documents. Rather than searching electronic documents for each full term query, embodiments create optimized query paths from the query collection such that query terms that occur most frequently within the query collection are searched first, and full term queries that contain a term that was found to not exist within the document are prevented from being executed. In this manner, embodiments may reduce the computing time and resources that may be needed to execute query collections against one or more electronic documents. Various embodiments of computer program products and methods for query collection optimization and execution of query collections against one or more electronic documents are described below.

Figure 1:
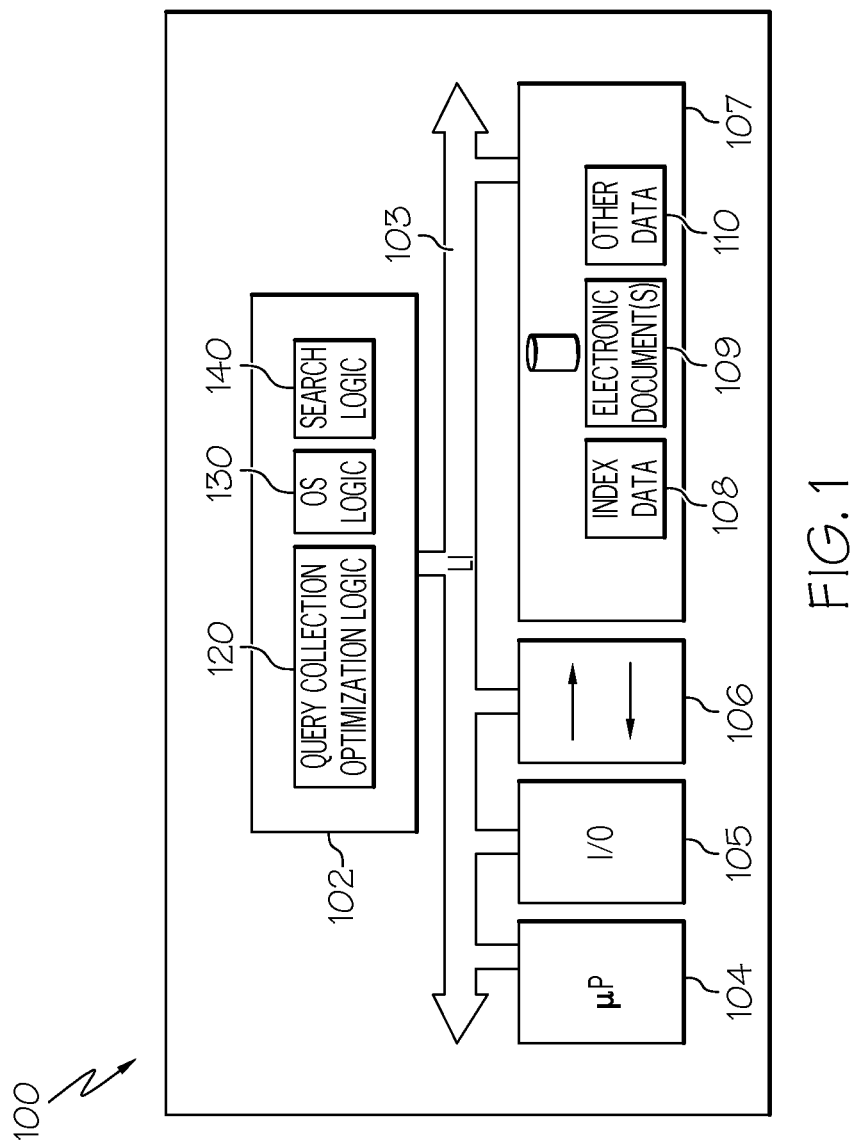
FIG. 1 depicts a schematic illustration of an exemplary computer device capable of optimizing a query collection and executing an optimized query collection against one or more documents according to one or more embodiments described and illustrated herein.

Referring now to the drawings, FIG. 1 depicts a computer device 100 according to one embodiment. More particularly, FIG. 1 depicts a computer device 100 for optimizing a query collection for execution against one or more electronic documents, and/or a non-transitory computer-readable medium for query collection optimization and searching embodied as hardware, software, and/or firmware, according to embodiments shown and described herein. While in some embodiments, the computer device 100 may be configured as a general purpose computer with the requisite hardware, software, and/or firmware, in some embodiments, the computer device 100 may be configured as a special purpose computer designed specifically for performing the functionality described herein, or as several computer devices that are communicatively coupled.

As also illustrated in FIG. 1, the computer device 100 may include a processor 104, input/output hardware 105, network interface hardware 106, a data storage component 107 (which may store document index data 108, electronic document(s) 109, and other data 110), and a non-transitory computer-readable medium (i.e., memory component 102). The memory component 102 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 102 may be configured to store, among other things, query collection optimization logic 120, operating system logic 130, and search logic 140 (each of which may be embodied as a computer program, firmware, or hardware, as an example). A local interface 103 is also included in FIG. 1 and may be implemented as a bus or other interface to facilitate communication among the components of the computer device 100.

The processor 104 may include any processing component configured to receive and execute instructions (such as from the data storage component 107 and/or memory component 102). The input/output hardware 105 may include a monitor, keyboard, mouse, printer, camera, microphone, speaker, touch-screen, and/or other device for receiving, sending, and/or presenting data. The network interface hardware 106 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 107 may reside local to and/or remote from the computer device 100 and may be configured to store one or more pieces of data for access by the computer device 100 and/or other components. As illustrated in FIG. 1, the data storage component 107 may store document index data 108, which in at least one embodiment includes search indexing data/structures relating to the electronic document or documents to be searched using the query collection. The document index data 108 may also include indexing data relating to the indexing of the query collection. The electronic documents may be any type of document such as, but not limited to, scholarly papers, articles, patent documents, legal opinions, legal briefs, fictional works, and the like. The electronic documents 109 themselves may also be stored in one or more data storage devices. Other data 110 may be stored in the data storage component 107 (or other data storage device) to provide support for functionalities described herein (e.g., metadata that may be utilized to index the electronic documents, data utilized to execute the query collection, etc.).

Included in the memory component 102 are the query collection optimization logic 120, the operating system logic 130, and the search logic 140. The query collection optimization logic 120 may include computer-executable instructions (i.e., software) for optimizing query collections that are received as input to develop optimized query collection plans as described below. The operating system logic 130 may include an operating system and/or other software for managing components of the computer device 100. The search logic 140 may include computer-executable instructions for executing optimized query collections that are generated by the query collection optimization logic against electronic documents.

It should be understood that the components illustrated in FIG. 1 are merely exemplary and are not intended to limit the scope of this disclosure. More specifically, while the components in FIG. 1 are illustrated as residing within the computer device 100, this is a nonlimiting example. In some embodiments, one or more of the components may reside external to the computer device 100.

Figure 2:
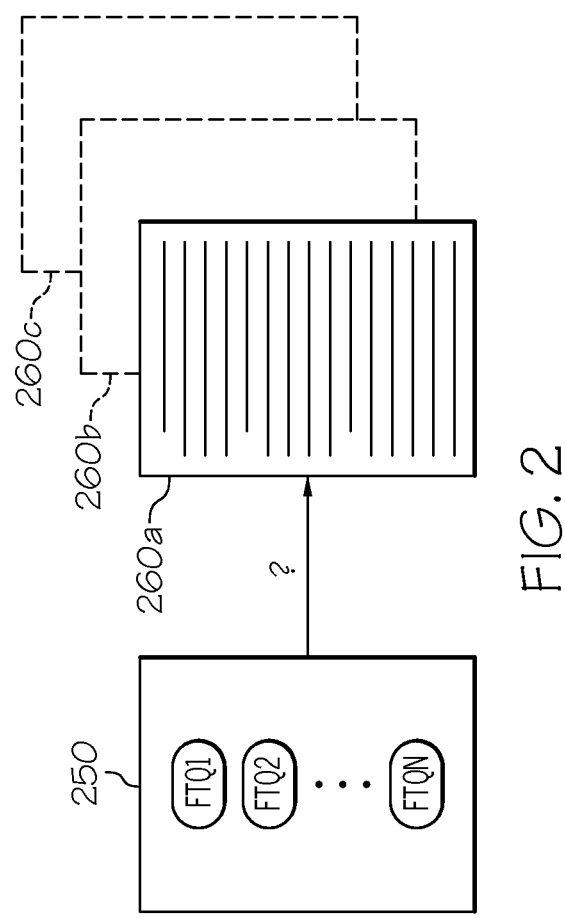
FIG. 2 depicts a schematic illustration of a query collection and three electronic documents according to one or more embodiments described and illustrated herein.

Referring now to FIG. 2, an exemplary query collection 250 and exemplary electronic documents 260a-260c are schematically illustrated. The query collection 250 is a collection of full term queries, such as full term query FTQ1, FTQ2, etc. A full term query may comprise any word, sequence of words, sequence of letters, numbers, and/or symbols, phrase, name, and the like. The query collection 250 illustrated in FIG. 2 is composed of N number of full term queries. The query collection 250 may comprise any number of full term queries. It is noted that the exemplary terms, full term queries, query collections described herein are used for illustrative, nonlimiting purposes only.

An operator of the computer device, or a software program, such as a back-end process, may desire to search an electronic document 260a (or documents) for the full term queries to determine if such full term queries are present in the electronic document 260a. As an example and not a limitation, the full term queries may be associated with finding some text within the electronic document 260a, or determining the particular subject matter of the electronic document 260a.

As described in detail below, embodiments described herein are directed to optimizing the execution of a query collection by finding, among the various full term queries, common terms that may be necessary for query success and executing those common terms first. A common term failure (when a common term executed against the electronic document does not return results) prevents execution of full term queries that include the particular failed common term.

As an example and not a limitation a raw query collection 250 may include the following full term queries indicated in Table 1, which are directed toward names of people:

TABLE 1

Robert Doe
Robert Jones
Robert Smith
Robert John Smith
John Doe
Jane Doe
Jim Doe
Bob Smith It should be understood that the query collection may include more or fewer full term queries. For example, a query collection may have hundreds or thousands of full term queries. The query collection of Table 1 is called a raw query collection because it contains the full term queries of the query collection without any processing. The raw query collection may have been inputted into the computer device by a user, such as by use of a keyboard and/or mouse. The raw query collection may also have been imported from another document or software application. Additionally, the raw full term query may have been accessed and/or generated by a back-end process.

The user or back-end process that requested that the query collection be used to search the electronic document (e.g., electronic documents 260a-260c of FIG. 2) would like to determine if the full term queries appear in the electronic document. For example, the first full term query "Robert Doe" will return success if the text "Robert Doe" appears somewhere within the electronic document.

The raw query collection provided in Table 1 has many common terms among the various full term queries (i.e., "John," "Robert," "Doe," etc.) such that without text of the electronic document matching these common terms, groups of full term queries within the query collection would fail to return results. In the illustrated example, a term is a word that indicates a part of a person's name. In other query collections, the terms may or not be words, as described above. It is noted that among common terms, a subset may be required to return results. In some instances, the common term is not a single word but a high-level construct. As an example and not a limitation, in the construct (judge or magistrate), the construct may be common amongst queries in the query collection, but neither "judge" nor "magistrate" is required to satisfy the query.

Embodiments are directed to query collection optimization methods that evaluate all of the full term queries as a whole and then break down the execution of the query collection into one or more query paths that search for the most common terms within the query collection first. Generally, if a common term is found within the electronic document during execution of the query collection, full terms queries that include the common term are run against the electronic document. If a common term is not found within the electronic document, full term queries that include the particular common term are prevented from being run against the electronic document, which may save processing time and resources.

Figure 3:
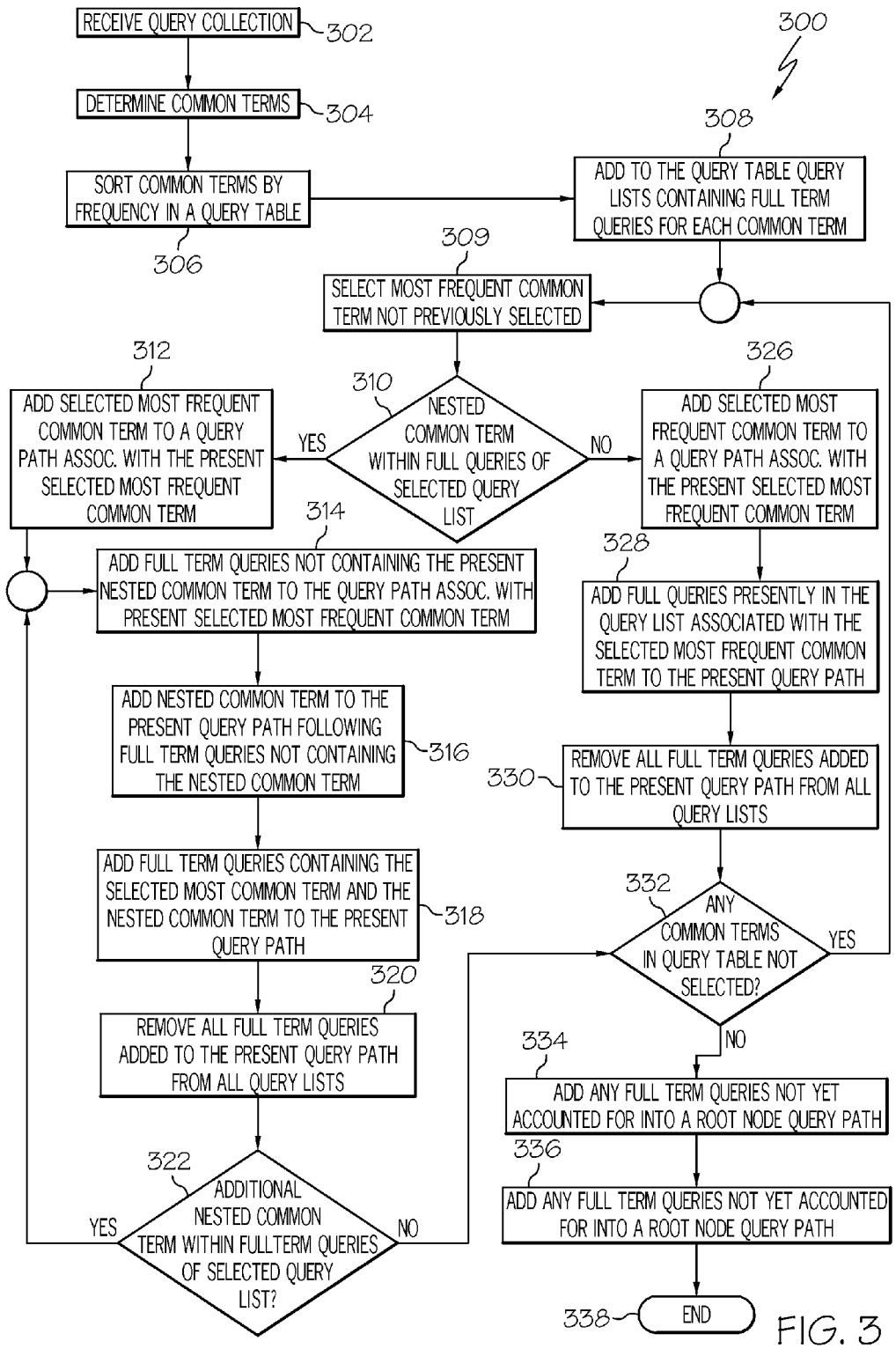
FIG. 3 depicts a flow chart of an exemplary optimization process according to one or more embodiments described and illustrated herein.

Referring now to FIG. 3, a flow chart 300 of an exemplary query collection optimization process according to one embodiment is illustrated. The flow chart 300 of FIG. 3 is described below with reference to the exemplary query collection of Table 1. It should be understood that embodiments are not limited to the query collection of Table 1, and it is referenced for illustrative, non-limiting purposes only.

At block 302, full term queries of a query collection are received by the computer device and/or the software program used to optimize the query collection (e.g., the query collection optimization logic 120 depicted in FIG. 1 and described above). The full term queries of the query collection may be received from any source. At block 304, the full term queries of query collection are parsed to find common terms throughout the query collection. Common terms are those terms that occur within the query collection more than once. At block 306, the common terms are sorted by frequency. In one embodiment, the common terms are populated into a first column of an optional query table by order of frequency within the query collection. At block 308, full term queries that include a common term are associated with that particular common term. For example, the full term queries may be listed as individual query lists in a second column of the query table, with full term queries populated into a row of the second column associated with the common term that the full term queries include (i.e., into a single cell defined by the row of the particular common term and the second column). A query list for common term "Robert" may be Robert Doe, Robert Jones, Robert Smith, and Robert John Smith. Using the query collection of Table 1, an exemplary query table after block 309 may look like Table 2 below:

TABLE 2

| Common Term | Frequency | Full Term Queries |
|---|---|---|
| Robert | 4 | Robert Doe |
|  |  | Robert Jones |
|  |  | Robert Smith |
|  |  | Robert John Smith |
| Doe | 4 | Robert Doe |
|  |  | John Doe |
|  |  | Jane Doe |
|  |  | Jim Doe |
| Smith | 3 | Robert Smith |
|  |  | Robert John Smith |
|  |  | Bob Smith |
| John | 2 | Robert John Smith |
|  |  | John Doe |

In some embodiments, the common terms are not limited to a single word, such as "Robert" or "Doe." It may also be a more complex query construct. As an example and not a limitation, and using the names of Table 1 above (e.g., names of judges), the queries of an exemplary query collection could be as follows:

TABLE 3

(judge or magistrate) pre/1 Robert Doe
(judge or magistrate) pre/1 Robert Jones
(judge or magistrate) pre/1 Robert Smith
(judge or magistrate) pre/1 Robert John Smith
(judge or magistrate) pre/1 John Doe
(judge or magistrate) pre/1 Jane Doe
(judge or magistrate) pre/1 Jim Doe
(judge or magistrate) pre/1 Bob Smith In the above exemplary query collection, the query (judge or magistrate) pre/1 Robert Doe would read "the word judge or magistrate preceding Robert Doe." As described in detail below, embodiments first execute common terms that are common to the greatest number of full term queries. In the above example, the common term (judge or magistrate) would be executed first. If it failed, then no other query paths would be executed.

Embodiments may execute the query collection such that common terms are searched first, which may lead to a "fast fail" of full term queries that include a frequent common term that is not initially found in the electronic document that is searched. Optimization may be provided when there are required elements that are common among at least two full term queries in the query collection. At block 309, the most frequent common term that has not yet been selected is selected for the building of a query path. In the present example, both Robert and Doe occur four times within the query collection.

It is then determined if there are any nested common terms within full term queries that include the selected most frequent common term at block 310. A nested common term is a term that appears more than once in full queries that include the selected most frequent common term. If a nested common term is found, the process moves to block 312. If a nested common term is not found, the process moves to block 326. Referring to Table 2, the term "Smith" appears twice in the query list for "Robert," which is the selected most frequent common term. Therefore, the selected most frequent common term "Robert" a nested common term in "Smith." It should be understood that more than one nested common term may be found, depending on the nature of the full term queries. The nested common terms may be processed in order of frequency, as described above.

Figure 4:
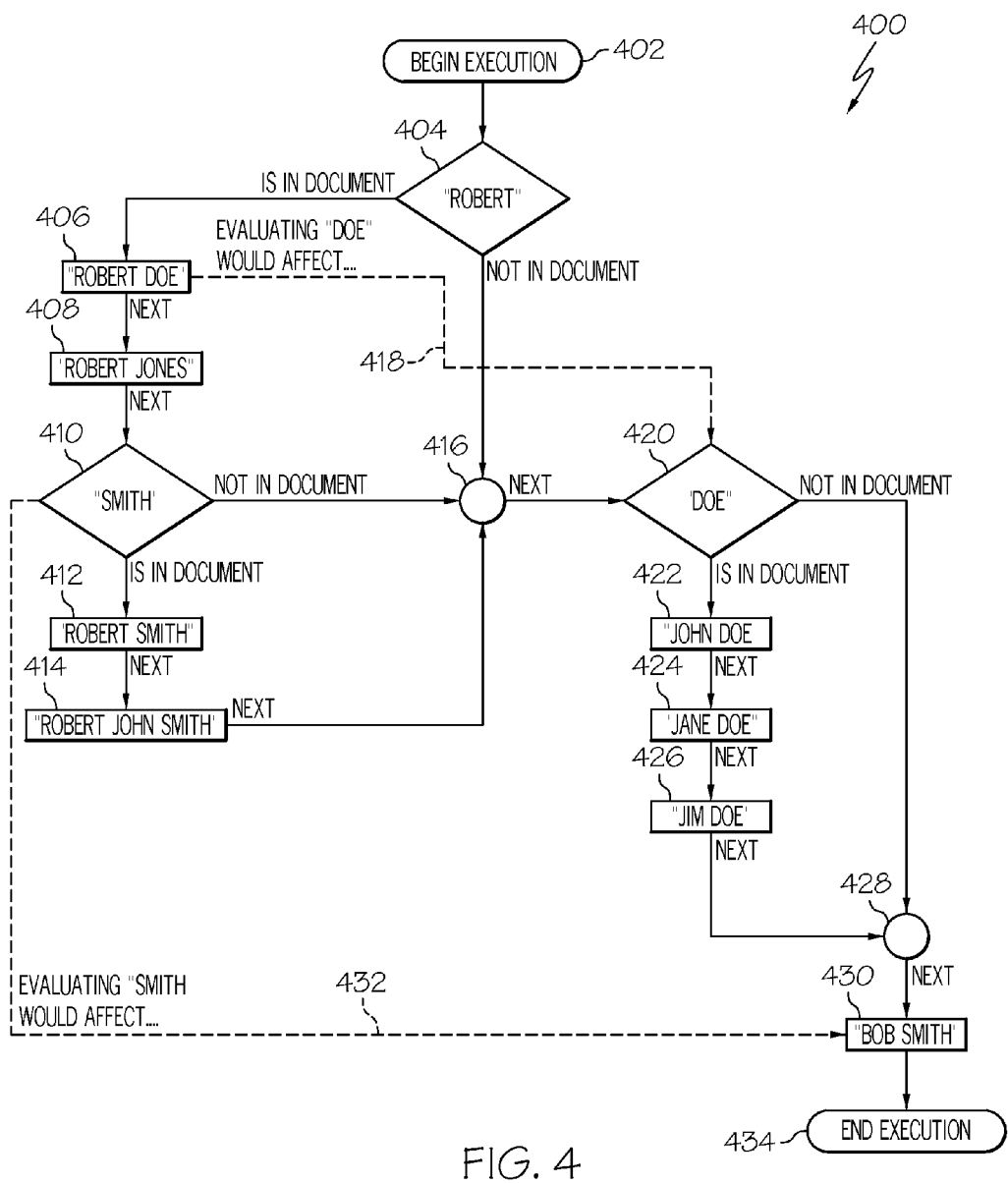
FIG. 4 depicts a flow chart of an exemplary optimized query collection for a hypothetical query collection according to one or more embodiments described and illustrated herein.

FIG. 4 is a flow chart 400 of an exemplary query optimization plan in accordance with the general query optimization process depicted in FIG. 3 and the raw query collection of Table 1. In other words, FIG. 4 represents an exemplary output of an application of the process of FIG. 3 as applied to the present example. FIGS. 3 and 4 are referred to concurrently below. Generally the exemplary query optimization process is described with reference to FIG. 3, and an exemplary output is described with reference to FIG. 4.

At block 312, the first term of the query path is created by adding the selected most frequent common term to the present query path. Referring to FIG. 4, the query term "Robert" is added as a root node of a query path at block 404. A root node is the first term of a query path. When the query optimization plan is executed, it will first execute the term "Robert" against the electronic document. Next, referring to FIG. 3, full term queries that include the selected most common term but do not include the nested common term are added to the query path at block 314. In the present example, the full term queries "Robert Doe" (block 406) and "Robert Jones" (block 408) include the selected most common term "Robert" and do not include the nested common term "Smith," and are therefore added to the present query path.

The current nested common term is added to the query path following the full term queries that include the selected most common term but do not include the nested common term at block 316. In the present example, the nested common term "Smith" is added to the query path as block 410. During execution, the nested common term "Smith" will be run against the electronic document. Next, full term queries that include both the selected most frequent common term and the nested common term are added to the query path. For example, the full term queries "Robert Smith" and "Robert John Smith" include both "Robert" and "Smith," and are therefore added to the query path as blocks 412 and 414, respectively. In this manner, the "Smith" path is added to the "Robert" path.

To prevent full term queries from being added to subsequent query paths and potentially being searched more than once (which may adversely affect optimization), all full term queries that were previously added to the present query path are removed from all query lists of the query table (block 320). In the present example, the modified query table at this stage may look like the following:

TABLE 4

| Common Term | Frequency | Full Term Queries |
|---|---|---|
| Robert | 4 | |
| Doe | 4 | John Doe |
| | | Jane Doe |
| | | Jim Doe |
| Smith | 3 | Bob Smith |
| John | 2 | John Doe |

At block 322 it is determined if there are any additional nested query terms within the modified query list for the selected most frequent common term. If so, the process returns to block 314 to continue to build the present query path as described above. If it is determined that there are no more nested common terms associated with the selected most frequent common term, the process continues to block 332 to check for additional common terms that were not yet selected.

In the present example, there are no more full term queries in the query list for the common term "Robert" because each term in the original query list was added to the query path. Therefore, the process will move to block 332 to determine if there are more common terms that have not yet been selected to generate a next query path. Referring to Table 4, the next common term not selected is "Doe." Therefore, the process will move back to 309, where "Doe" is selected as the most frequent common term not previously selected. It is noted that if there are no remaining common terms to be selected at block 332, the process moves to block 334, described below.

The process starting at block 309 using the next most frequent common term "Doe" will now be described with reference to FIGS. 3 and 4. After selecting the most frequent common term at block 309, the process moves to block 310, where it is determined if there are any nested common terms. As described above, if there is a nested common term, the process moves to block 312, and if there is no nested common term, the process moves to block 326. Referring to Table 4, there are no terms that occur more than once in the current query list for "Doe" other than the most frequent common term "Doe." Therefore, in the present example, the process moves to block 326, where the selected most frequent common term is added as a root node of the query path for the "Doe" query path. The "Doe" path starts at block 420 as illustrated in FIG. 4.

At block 328, the full term queries presently in the query list associated with the selected most frequent common term are added to the present query path. Referring to FIG. 4, the full term queries "John Doe," "Jane Doe," and "Jim Doe" have been added to the "Doe" query path as blocks 422, 424, and 426, respectively. To prevent full term queries that were added to the present query path from being added to subsequent, other query paths, they are removed from all query lists at block 330. In the present example, the modified query table may now look like the following:

TABLE 5

| Common Term | Frequency | Full Term Queries |
|---|---|---|
| Robert | 4 | |
| Doe | 4 | |
| Smith | 3 | Bob Smith |
| John | 2 | |

Next, the process moves to block 332, which, as describes above, evaluates whether or not there are additional common terms that have not yet been selected. Table 5 reveals that "Smith" does occur as the next common term. However, the term "Smith" was previously selected as a nested common term under the "Robert" path. Therefore, it is not considered a common term not previously selected. Additionally, "John" is also a remaining common term that has yet to be selected. However, there are no remaining full term queries in the query list associated with the common term "John." Therefore, it is also not considered a common term not previously selected. Accordingly, the decision at block 332 may be a determination of whether there are any common terms not previously selected as a most frequent common term or a nest common term, and that have full term queries remaining in the associated query list.

If there are no remaining common terms that satisfy the requirements of block 332, the process will move to block 334. At block 334, each remaining full term query in the query table is added as an individual root node. Here, the only full term query that remains is "Bob Smith." Therefore, it is added as its own query path as a single root node that follows the "Doe" query path. If there were additional full term queries in the example, the additional full term queries would also be added as their own query paths.

Next, at block 336 the generated query collection optimization plan is executed against one or more electronic documents, and terminates at block 338, where results may be displayed and/or provided for further processing.

Execution of the exemplary query collection optimization plan depicted in FIG. 4 will now be described. It is understood that embodiments are not limited to the query collection optimization plan depicted in FIG. 4, as it is provided merely as an example. The query collection optimization plans generated by the embodiments described herein depend on the raw query collections that are provided. After completion of the query collection optimization plan (e.g., as illustrated in FIG. 3), the execution process begins at block 402. The common term "Robert" is then executed against the electronic document being evaluated at block 404. If the "Robert" is found in the electronic document, the full term queries "Robert Doe" and "Robert Jones" are then executed at blocks 406 and 408, respectively. If "Robert" is not found in the electronic document, the process continues to node 416, where it then continues to evaluate the second common query term "Doe." It is noted that node 416 does not represent a process action and is used only to indicate a meeting point of several process paths. If full term queries are found in the electronic document, the search logic may store result information accordingly (e.g., the fact that the term was found, the location of the full term query in the electronic document, or any other information).

In some embodiments, the result of the execution of each common term and each full term query may be cached for later use during execution of subsequent query paths. The cached result may be binary in one embodiment, wherein a "1" indicates that the particular term was found, and a "0" indicates that a particular term was not found. Alternative caching means are also contemplated. In the present example, the evaluation of the full term query "Robert Doe" provides for an evaluation of the term "Doe," which may affect the evaluation of common term "Doe," as indicated by dashed arrow 418. If the process evaluates "Doe" (individually or in conjunction with "Robert") against the electronic document at block 406, the determination at block 420 may also be made. In this manner, subsequent query paths may be "short circuited" by the results of a query path currently being executed. For example, if "Doe" is found at block 406, the process may automatically continue to block 422 without performing another search of the electronic document for "Doe" at block 420. The search logic does not have to re-search "Doe" to know whether it exists in the electronic document. This may significantly speed up execution of the optimized query collection plan.

In one embodiment, caching match results may be implemented by using Lucene as the underlying document index. It is noted that the above-described caching strategy is not a function of Lucene, but in the embodiment that uses Lucene to index the document. Further, embodiments are not limited to Lucene, and could be implemented with other document indexers.

Referring once again to FIG. 4, after evaluating "Robert Jones," the search logic will execute the nested common term "Smith" against the electronic document at block 410. If it is found, the electronic document will be searched for full term queries "Robert Smith" and "Robert John Smith" at blocks 412 and 414, respectively. If "Smith" is not found, the process will go to node 416, where it then moves to block 420 to evaluate "Doe." It is noted that the evaluation of "Smith" may affect the search for "Bob Smith" at block 430, as indicated by dashed arrow 432. For example, if "Smith" is not found, the result may be cached and retrieved at block 430 so that the full term query "Bob Smith" is prevented from running against the electronic document.

After searching the electronic document for "Robert John Smith" at block 414, the process goes to node 416, where it then moves to block 420, where common term "Doe" is evaluated. If a caching strategy is used as described above, "Doe" may not need to be searched again at block 420. If an execution of "Doe" against the electronic document, or if a cached result of the search at 406 indicates the presence of "Doe," the process continues by searching "John Doe," "Jane Doe," and "Jim Doe" at blocks 422, 424, and 426, respectively. If "Doe" is searched and not found in the electronic document, or if the cached result at block 406 indicates that "Doe" is not present in the electronic document, the process continues to node 428 and consideration of "Bob Smith" at block 430. "Bob Smith" is also considered after evaluating "Jim Doe" at block 426. The full term query "Bob Smith" may be searched against the electronic document, or a cached search result considered as indicated by dashed arrow 432. The execution of the optimized query collection plan is then ended at block 434, where search results may be provided for display and/or further processing. In some embodiments, the optimized query collection plan(s) may be saved to one or more files for later use and distribution by the search system.

It should now be understood that embodiments described herein optimize the execution of a query collection against one or more electronic documents such that common terms that occur within the query collection at a greater frequency are searched first. If a common term is found in the electronic document, full term queries that include the common term are searched. If a common term is not found, full term queries that include the common term are prevented from being searched, thus saving processing time and resources. Additionally, a caching strategy may also be utilized to keep track of search results such that the same common terms or full term queries do not need to be executed against the electronic document multiple times.

The embodiments described herein build query paths of an optimized query collection plan in a recursive manner, which may simplify the search code. Embodiments may start at a root set of full term queries, and apply common term identification and path building as the various common terms and associated full term queries are evaluated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A computer program product for use with a computer device to execute a query collection against one or more electronic documents, the query collection comprising a plurality of full term queries, the computer program product comprising:
a computer-readable medium storing computer-executable instructions for executing the query collection that, when executed by a processor of the computer device, cause the computer device to:
receive the query collection;
determine common terms within the query collection;
sort the common terms by a frequency within the query collection;
search the one or more electronic documents according to an optimized query collection plan such that the one or more electronic documents are searched for the common terms in accordance with the frequency within the query collection;
for each common term found in the one or more electronic documents, search the one or more electronic documents for full term queries that include the common term that was found in the one or more electronic documents; and
for each common term not found in the one or more electronic documents, prevent a search of the one or more electronic documents for the full term queries that include the common term that was not found in the one or more electronic documents.

2. The computer program product of claim 1, wherein the computer-executable instructions cause the computer device to cache a search result of terms executed during the search of the one or more electronic documents.

3. The computer program product of claim 2, wherein the computer-executable instructions cause the computer device to:
prevent a search of the one or more electronic documents for the full term queries of the query collection that contain a cached search result that indicates a common term was previously not found within the one or more electronic documents; and
search the one or more electronic documents for the full term queries of the query collection that contain a cached search result that indicates a common term was previously found within the one or more electronic documents.

4. The computer program product of claim 1, wherein the computer-executable instructions cause the computer device to determine a nested common term within the full term queries that include the common term.

5. The computer program product of claim 4, wherein the computer-executable instructions cause the computer device to, for each nested common term, search the one or more electronic documents for the nested common term such that the nested common term is searched after the full term queries that include the common term but do not include the nested common term.

6. The computer program product of claim 5, wherein the computer-executable instructions further cause the computer device to:
for each nested common term found in the one or more electronic documents, search the one or more electronic documents for the full term queries that include the nested common term that was found in the one or more electronic documents; and
for each nested common term not found in the one or more electronic documents, prevent a search of the one or more electronic documents for the full term queries that include the nested common term that was not found in the one or more electronic documents.

7. The computer program product of claim 1, wherein the computer-executable instructions are such that the optimized query collection plan is created by causing the computer device to:
select a most frequent common term of the query collection, wherein the most frequent common term is the common term that was not previously selected and occurs most frequently within the query collection;
create a query path associated with the most frequent common term, the query path comprising the common term as a root node followed by the full term queries that include the common term; and
prevent the full term queries that were added to the query path from being added to other query paths.

8. The computer program product of claim 7, wherein the computer-executable instructions are such that the query path is created by causing the computer device to:
add the most frequent common term as the root node of the query path;
search for a nested common term within the full term queries that contain the most frequent common term, wherein the nested common term is a term that occurs more than once within the full term queries that contain the most frequent common term;
add the full term queries to the query path that include the most frequent common term and do not include any nested common term; and
if a nested common term was found, add the nested common term to the query path, followed by the full term queries that include the most frequent common term and the nested common term.

9. The computer program product of claim 8, wherein the computer-executable instructions further cause the computer device to:
create a query table comprising a first column for common terms, and a second column for the full term queries;
populate the common terms into the first column by the frequency of the common terms within the query collection, wherein each individual common term is populated into a single cell of the query table such that each individual common term defines a row of the query table; and
populate each row of the second column with the full term queries that contain the common term defined by the individual common term, wherein the full term queries of each individual row define a query list.

10. A method of executing a query collection against one or more electronic documents, the query collection comprising a plurality of full term queries, and the method comprising:
receiving the query collection;
determining common terms within the query collection;
searching, by a computer, the one or more electronic documents for the common terms in accordance with a frequency that the common terms appear in the query collection;
for each common term found in the one or more electronic documents, searching the one or more electronic documents for full term queries that include the common term that was found in the one or more electronic documents; and
for each common term not found in the one or more electronic documents, preventing a search of the one or more electronic documents for the full term queries that include the common term that was not found in the one or more electronic documents.

11. The method of claim 10, further comprising:
caching a search result of terms executed during the search of the one or more electronic documents;
preventing a search of the one or more electronic documents for the full term queries of the query collection that contain a cached search result that indicates a common term was previously not found within the one or more electronic documents; and
searching the one or more electronic documents for the full term queries of the query collection that contain a cached search result that indicates a common term was previously found within the one or more electronic documents.

12. The method of claim 10, further comprising determining a nested common term within the full term queries that include the common term.

13. The method of claim 12, further comprising, for each nested common term, searching the one or more electronic documents for the nested common term such that the nested common term is searched after the full term queries that include the common term but do not include the nested common term.

14. The method of claim 13, further comprising:
for each nested common term found in the one or more electronic documents, searching the one or more electronic documents for the full term queries that include the nested common term that was found in the one or more electronic documents; and
for each nested common term not found in the one or more electronic documents, preventing a search of the one or more electronic documents for the full term queries that include the nested common term that was not found in the one or more electronic documents.

15. The method of claim 10, further comprising:
creating a query table comprising a first column for common terms, and a second column for the full term queries;
populating the common terms into the first column by the frequency of the common terms within the query collection, wherein each individual common term is populated into a single cell of the query table such that each individual common term defines a row of the query table; and
populating each row of the second column with the full term queries that contain the common term defined by the individual common term, wherein the full term queries of each individual row define a query list.

16. The method of claim 15, further comprising removing the full term queries that were previously executed from the query table to prevent previously-executed full term queries from being searched multiple times.

17. A method of creating an optimized query collection plan from a query collection, the query collection comprising a plurality of full term queries, and the method comprising:
receiving the query collection;
determining common terms within the query collection;
sorting the common terms by frequency within the query collection;
selecting a most frequent common term of the query collection, wherein the most frequent common term is a common term that was not previously selected and occurs most frequently within the query collection;
creating a query path associated with the most frequent common term by:
adding the most frequent common term as a root node of the query path;
searching for a nested common term within full term queries that contain the most frequent common term, wherein the nested common term is a term that occurs more than once within the full term queries that contain the most frequent common term;
adding the full term queries to the query path that include the most frequent common term and do not include any nested common term; and
if a nested common term was found, adding to the query path the nested common term, followed by adding the full term queries that include the most frequent common term and the nested common term; and
preventing the full term queries that were added to the query path from being added to other query paths.

18. The method of claim 17, further comprising, following creating the query path associated with the most frequent common term, selecting a next most frequent common term of the optimized query collection plan not previously selected, and creating a next query path associated with the next most frequent common term by:
adding the next most frequent common term as the root node of the next query path;
searching for a nested common term within the full term queries that contain the next most frequent common term, wherein the nested common term is a term that occurs more than once within the full term queries that contain the next most frequent common term;
adding full term queries to the next query path that include the next most frequent common term and do not include any nested common term; and
if a nested common term was found, adding to the next query path the nested common term, followed by adding the full term queries that include the next most frequent common term and the nested common term; and
preventing the full term queries that were added to the next query path from being added to other query paths.

19. The method of claim 17, further comprising:
creating a query table comprising a first column for common terms, and a second column for the full term queries;
populating the common terms into the first column by the frequency of the common terms within the query collection, wherein each individual common term is populated into a single cell of the query table such that each individual common term defines a row of the query table; and populating each row of the second column with the full term queries that contain the common term defined by the individual common term, wherein the full term queries of each individual row define a query list.

20. The method of claim 19, further comprising removing the full term queries that were previously evaluated from the query table to prevent the full term queries from being searched multiple times.

\* \* \* \* \*